United States Patent [19]
Klages et al.

[11] Patent Number: 5,560,647
[45] Date of Patent: Oct. 1, 1996

[54] AIRBAG COVER TEARSEAM TRANSITION

[75] Inventors: William R. Klages, Auburn Hills, Mich.; Daniel S. Garceau, South Ogden, Utah; Frederick J. Werth, Lake Orion, Mich.

[73] Assignee: Morton International, Inc., Chicago, Ill.

[21] Appl. No.: 527,492

[22] Filed: Sep. 13, 1995

[51] Int. Cl.$^6$ .................................................. B60R 21/20
[52] U.S. Cl. .................................................. 280/728.3
[58] Field of Search .............................. 280/728.3, 732, 280/731, 730.1, 728.2, 728.1

[56] References Cited

U.S. PATENT DOCUMENTS

| | | | |
|---|---|---|---|
| 5,002,307 | 3/1991 | Heidorn | 280/728.3 |
| 5,320,380 | 6/1994 | Hamada et al. | 280/728.3 |

FOREIGN PATENT DOCUMENTS

| | | | |
|---|---|---|---|
| 2250295 | 6/1992 | United Kingdom | 280/728.3 |
| 2279302 | 1/1995 | United Kingdom | 280/728.3 |

*Primary Examiner*—Kevin Hurley
*Assistant Examiner*—Peter C. English
*Attorney, Agent, or Firm*—George W. Rauchfuss, Jr.; Gerald K. White

[57] ABSTRACT

An airbag module cover includes a panel which is designed to function as a portion of a vehicle's interior aesthetics. The cover includes at least one locking leg which is secured to a reaction canister. The leg carries the primary, or initially actuated, tearseam. Secondary tearseams are provided on the hidden surface of the panel and are not visible to an occupant. Transition openings in the leg transfer the bursting force from the primary to the secondary tearseams which form an airbag-releasing door upon actuation.

8 Claims, 3 Drawing Sheets

AIRBAG COVER TEARSEAM TRANSITION

TECHNICAL FIELD

This invention relates to the field of automotive airbags. More particularly, it relates to an airbag cover having a novel tearseam construction.

BACKGROUND ART

The conventional automotive airbag installation, whether for a driver's or passenger's side, customarily includes a reaction canister which encloses a folded airbag, a source of pressurizing gas which inflates the airbag upon occurrence of a crash of sufficient magnitude, and a rupturable cover which closes the mouth of the reaction canister. The cover is conventionally formed and configured as a part of the vehicle's interior aesthetics. A driver's side airbag module is normally installed within the confines of the steering wheel. The passenger side airbag is conventionally mounted within the dashboard facing the passenger. The covers are normally designed to split open under the influence of the expanding airbag. This is achieved by lines of weakness in the airbag cover, conventionally termed "tearseams". The tearseams are configured such that, when bursting, they form one or more hinged doors which release the airbag into the vehicle interior.

It is normally desirable to control the sequence of bursting of the tearseams to properly orchestrate the formation of the doors, while preventing the formation and discharge of cover particles into the passenger compartment. Accordingly, it is usually desirable to provide that one of the tearseams initiates the bursting action which thereupon flows into the remaining seams in sequential fashion. To this end the initial tearseam must be the most easily rupturable.

Several methods may be employed to form the rupturable tearseams. One of the simplest would be a series of perforations. However, this would probably not be aesthetically acceptable in a luxury or higher quality vehicle. A more common method is to form the tearseam as a groove along the hidden surface of the cover material, thereby thinning the cover material to an acceptable burst strength. However, one difficulty with this is that the initial tearseam may be visible from the front of the cover which is normally made of an injected molded material. This may be aesthetically undesirable.

Accordingly, it is a primary object of the present invention to provide an automotive airbag cover wherein the initial or primary tearseam lies in an extension of the cover which is normally hidden from sight. Another object is to provide such a cover having a novel transition permitting the rupture of the primary tearseam to proceed into tearseams in the main body of the cover to form the airbag release door. Other objects, features and advantages will become apparent from the following description and appended claims.

DISCLOSURE OF INVENTION

The invention comprises an airbag cover of the type having a main body with a front, normally exposed, surface. The cover includes an integral locking member which extends away from the cover main body to retain it in position on an airbag housing. The primary tearseam is defined by the locking member. A transition opening extends through the locking member at each end of the primary tearseam. Each of the transition openings communicates with a secondary tearseam in the main body of the airbag cover. The primary tearseam ruptures first, followed thereafter by the rupture of the secondary tearseams, thereby defining an airbag release door.

BEST MODE FOR CARRYING OUT THE INVENTION

Figure 1:
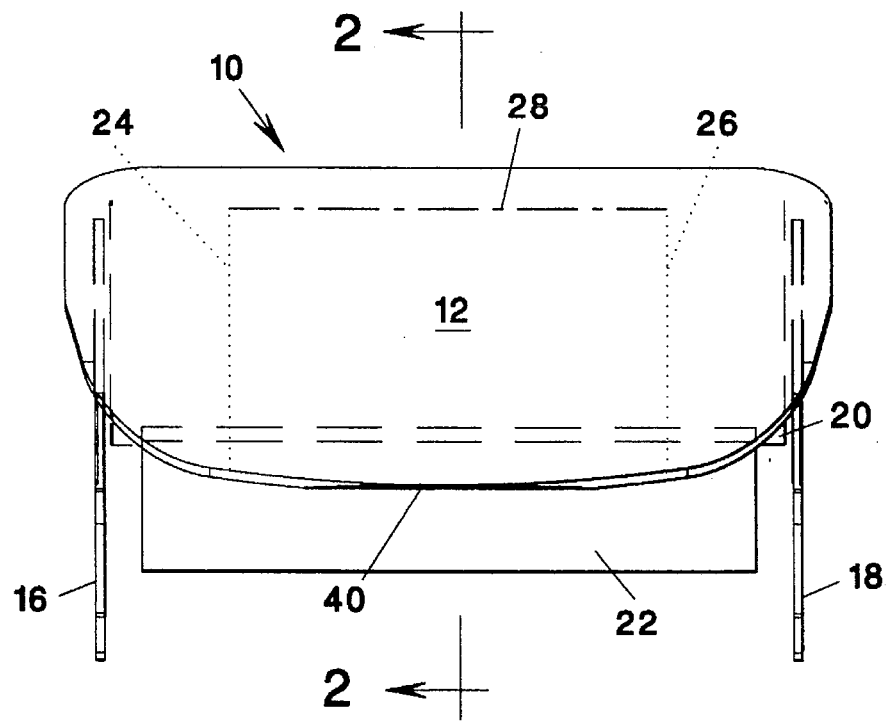
FIG. 1 is an elevational view of an airbag cover in accordance with the present invention.
Figure 2:
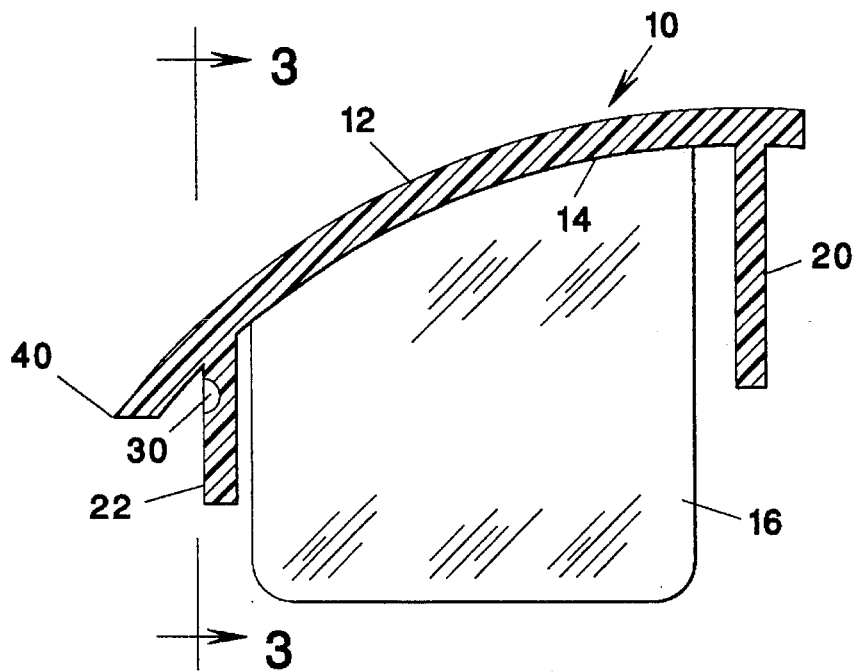
FIG. 2 is a cross-section taken substantially along the line 2—2 of FIG. 1.

With particular reference to FIGS. 1 and 2, there is illustrated an airbag module cover having a main body panel 10 with a front surface 12 and a rear surface 14. Panel 10 is styled to fit within an automotive dashboard. The cover is an integrally molded unit which carries at each end left 16 and right 18 side flaps. The side flaps, however, do not form a part of the invention and need not be further described. Also molded integrally with the panel 10 is a rear locking member 20 and a front locking member 22. (The terms "front," "rear," "top," "bottom," "left," and "right" are all relative to drawing figures. In actuality, the orientation would depend upon the placement of the cover in the particular vehicle.) The locking members 20, 22 are designed to be hidden from sight by extending into the reaction canister where they are retained by suitable locking means (not shown). As the panel 10 is designed to be incorporated into, and form a portion of, the vehicle dashboard, it is preferable that its front surface be visually uniform without disclosing the existence of the tearseams. However, it is also desired that the panel 10 be rupturable along tearlines 24, 26 to form an airbag release door extending from the front edge 40 of the panel 10 and pivotable along a hinge line 28.

In order to achieve this result, a primary tearseam 30 is formed in the front locking member 22 near its juncture with the rear surface 14 of the main body 10 and extending parallel thereto. In the illustrated embodiment, the tearseam 30 is in the form of a semi-cylindrical groove. However, this is not a limiting factor. Any suitable means may be employed for the tearseam including grooves of different shape, incorporation of a weaker material, or even a series of perforations, the primary objective being to provide a tearseam which will burst under the force of an expanding airbag before the tearseams in the panel 10 to be described.

Figure 3:
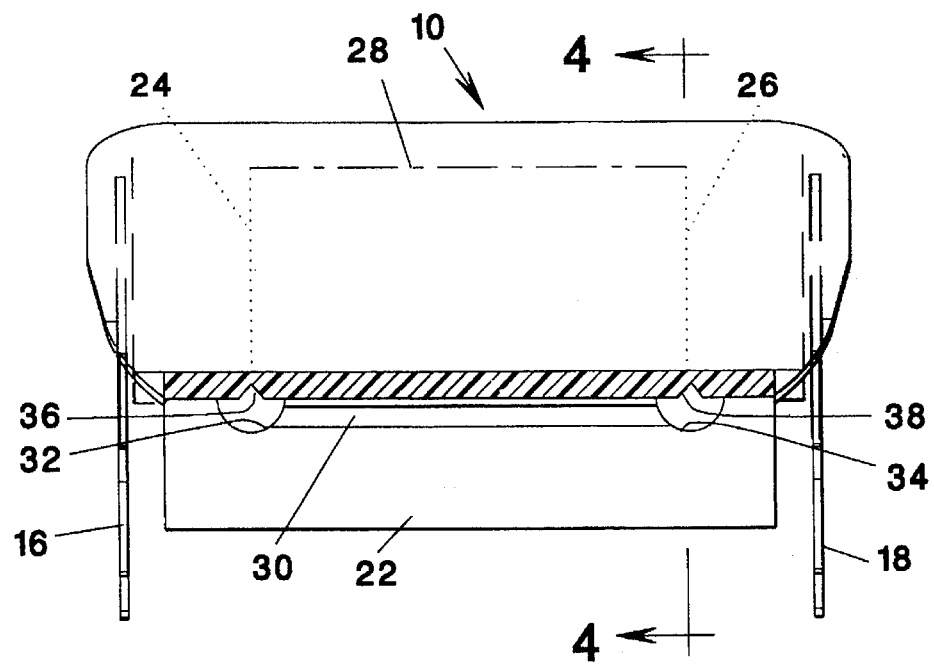
FIG. 3 is a cross-section taken substantially along the line 3—3 of FIG. 2.

As illustrated in FIG. 3, the primary tearseam 30 extends horizontally along the surface of the locking member 22 and its ends terminate at left 32 and right 34 transition openings which are essentially semi-circular and each of which extends completely through the front locking member 22. The transition openings need not be semi-circular and may or may not extend completely through the locking member. They need only to allow the tear to transition.

Figure 4:
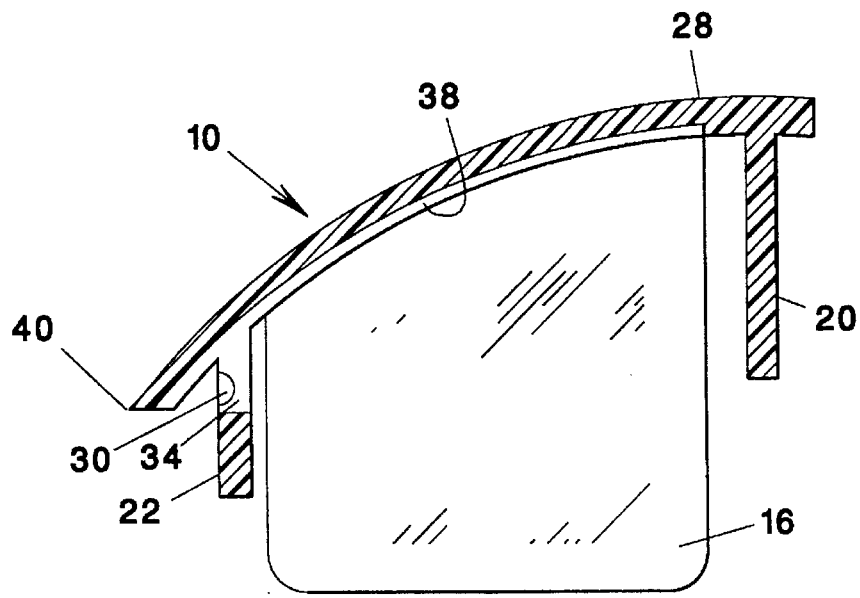
FIG. 4 is a cross-section taken substantially along the line 4—4 of FIG. 3.

In order to form a door in the panel 10 its rear surface carries left 36 and right 38 door-forming grooves which constitute secondary tearseams colinear with tearlines 24, 26. As illustrated in FIGS. 3 and 4, these grooves are essentially V-shaped and extend from the front edge 40 of the panel 10 to the ends of the proposed hinge line 28. The cross-sectional shape of the grooves 36, 38 is not important. However, they are designed to provide a tearseam which is slightly stronger than the primary tearseam 30 in the front locking member 22. It is also desirable that they not be visible through the front surface of the panel

OPERATION

Figure 5:
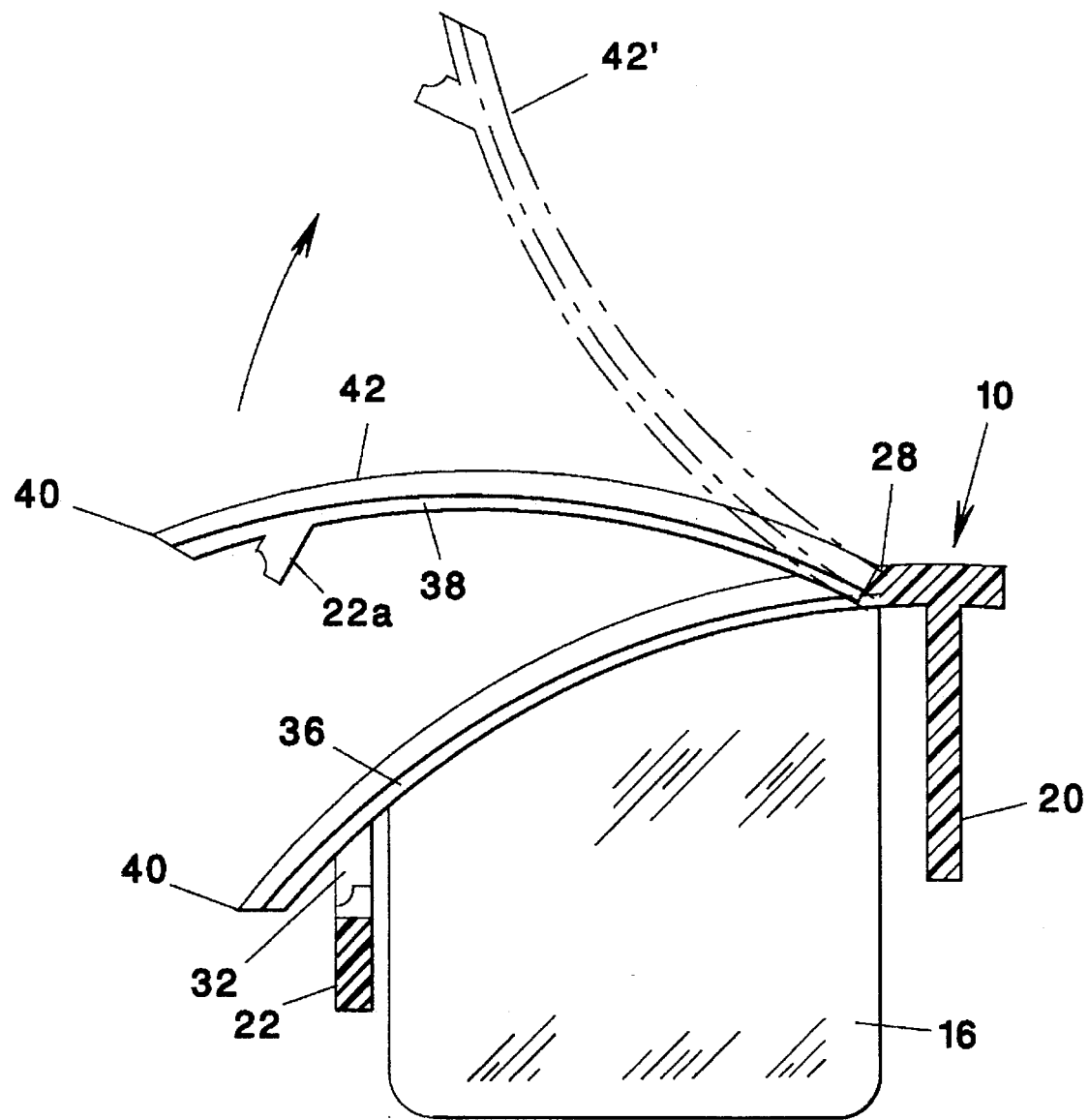
FIG. 5 is a view similar to FIG. 4 illustrating the cover action during tearseam rupture.

Operation of the cover of this invention may be best understood by reference to FIG. 5. As the airbag within the reaction canister begins to expand, it applies an upward force against the panel 10. As a result of this force, the primary tearseam 30 in the front locking member 22 begins to rupture along its length until it reaches the left and right transition openings 32, 34. In so rupturing, it releases a segment 22a of the front locking member 22 which remains attached to the panel 10. The front edge 40 of the panel 10 between the transition openings 32, 34 begins to rise and, upon final separation of the primary tearseam 30, the expanding force is transferred to the secondary tearseams defined by left door-forming groove 36 and right door-forming groove 38. These grooves begin to split from the front edge 40 of the cover 10 along the tearlines 24, 26 until they reach the hinge line 28 region as illustrated in FIG. 5. A door 42 is thereby formed which is caused to flex upwardly about the hinge line 28 into a full open position 42', thereby permitting the fully inflated airbag to escape into the passenger compartment.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an automotive airbag cover of the type having a panel with a surrounding edge and a front surface which is normally exposed when installed in a module in an automotive vehicle and a normally hidden rear surface, said panel including at least one integral locking member extending away from the normally hidden surface of said panel at a juncture therewith for retaining said cover in said module, said locking member being hidden from sight when so installed, the improvement which comprises:

a primary tearseam, having first and second ends, defined by one of said locking members;

first and second transition openings extending through said one locking member at said juncture and communicating with said tearseam at its respective first and second ends;

a first secondary tearseam, having a first and a second end, defined by the rear surface of said panel and passing through said first transition opening at said juncture; and a second secondary tearseam, having a first and a second end, defined by the rear surface of said panel and passing through said second transition opening at said juncture;

whereby, under the force of an expanding airbag, said primary tearseam first ruptures, transferring said force to said first and second secondary tearseams which rupture thereafter to define an airbag-releasing door in said panel.

2. The improvement of claim 1 wherein said primary tearseam is a groove in said one locking member.

3. The improvement of claim 2 wherein said primary tearseam groove is adjacent said juncture and substantially parallel thereto.

4. The improvement of claim 1 wherein each of said secondary tearseams is a groove in the rear surface of said panel.

5. The improvement of claim 4 wherein the first ends of said secondary tearseam grooves are positioned at the edge of said panel and the second ends are positioned on a common hinge line.

6. The improvement of claim 5 wherein said first and second secondary tearseam grooves are substantially parallel.

7. The improvement of claim 6 wherein said primary tearseam is a groove in said one locking member.

8. The improvement of claim 7 wherein said primary tearseam groove is adjacent said juncture and substantially parallel thereto.

* * * * *

UNITED STATES PATENT AND TRADEMARK OFFICE
CERTIFICATE OF CORRECTION

PATENT NO. : 5,560,647
DATED : 1 October 1996
INVENTOR(S) : William R. Klages et al.

It is certified that error appears in the above-indentified patent and that said Letters Patent is hereby corrected as shown below:

At column 3, line 6, "surface of the panel" should be --surface of the panel 10.--.

Signed and Sealed this

Eleventh Day of March, 1997

Attest:

BRUCE LEHMAN

Attesting Officer

Commissioner of Patents and Trademarks